BUSY VERIFICATION CIRCUIT FOR PRIVATE BRANCH EXCHANGES

Filed April 28, 1964 2 Sheets-Sheet 1

INVENTORS G. A. MICHALOPOULOS
L. E. THELEMAQUE
BY J. R. McCorkindale
ATTORNEY

BUSY VERIFICATION CIRCUIT FOR PRIVATE BRANCH EXCHANGES

Filed April 28, 1964 2 Sheets-Sheet 2

United States Patent Office 3,327,065 Patented June 20, 1967

3,327,065

BUSY VERIFICATION CIRCUIT FOR PRIVATE BRANCH EXCHANGES

Gust A. Michalopoulos, Oak Park, Ill., and Louis E. Thelemaque, Brooklyn, N.Y.; said Michalopoulos assignor to Western Electric Company Incorporated, New York, N.Y., a corporation of New York, and said Thelemaque assignor to Bell Telephone Laboratories, Incorporated, New York, N.Y., a corporation of New York Filed Apr. 28, 1964, Ser. No. 363,138
8 Claims. (Cl. 179—27)

ABSTRACT OF THE DISCLOSURE

A busy verification trunk circuit is used as an auxiliary to a selected one of the group of attendant's trunks of a PBX whereby to permit connection of the attendant's trunk to a seemingly busy extension of the PBX for "verification" purposes. The busy verification trunk is inserted between the atendant's trunk and the marker being used in the connection, and the class of service of the verification trunk is temporarily changed to a "central office trunk" class of service during marker action. This permits the marker to cut through the verification connection to the dialed PBX extension even though the extension is busy.

Figure 1:
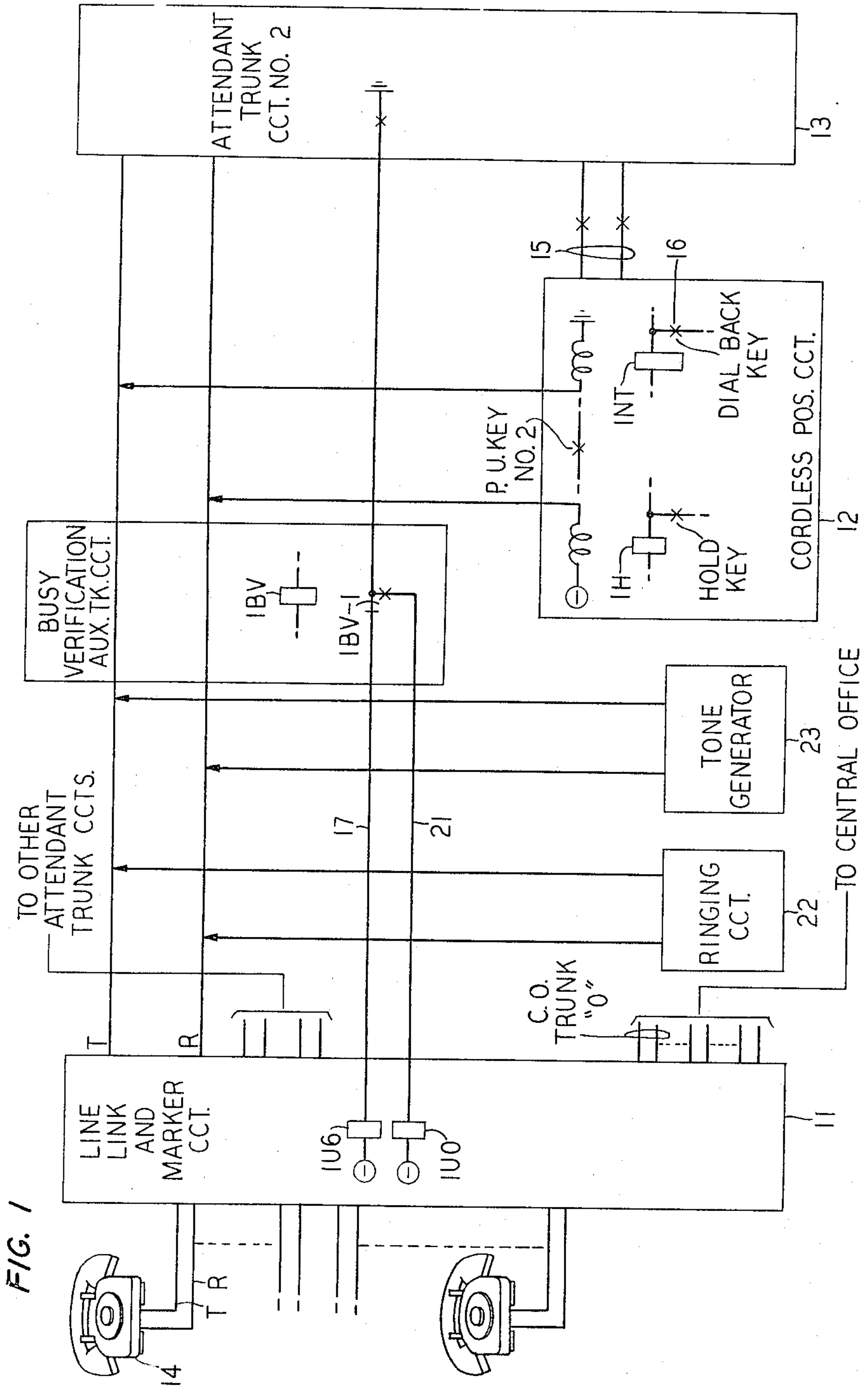

This invention relates to a private branch exchange telephone system and more particularly to a private branch exchange telephone system which includes busy verification facilities.

In instances where a telephone customer, for example a business firm, a government agency, or the like, requires a relatively large number of extensions, it is the usual practice to provide on the premises, or conveniently located thereto, a private branch exchange commonly referred to so as a PBX. The larger PBX's are usually served by one or more attendants from a console or attendant's position and function essentially as a small telephone central office in that intrastation calls between extensions on the premises are completed through the PBX, as well as calls from the extensions to subscribers served through remote central offices and calls from such subscribers to extensions served by the PBX. An automatic private branch exchange of the type capable of serving a relatively large number of extensions and providing many advanced features is disclosed in Patent 2,904,637, issued Sept. 15, 1959, to R. D. Williams.

It is common practice to provide in connection with larger central offices so-called busy verification trunk facilities by means of which an apparently "busy" line can be checked by the operator in order to determine whether the line is actually in use for talking or if the "busy" indication is caused by some other condition, for example an accidental "off-hook" at the station. Such a check is often requested by a customer who has received repeated busy signals over an extended period of time when attempting to call a particular station. Through use of the busy verification facilities the operator is able to cut in on the busy line and listen for actual talking.

It has been recognized that there is a need for similar busy verification trunk facilities in connection with automatic private branch exchanges of the larger variety such as that disclosed in the Williams Patent 2,904,637 referred to above. However, since there is inherent in such facilities the ability of the operator or attendant to cut in on a busy line, a function ordinarily denied to attendants of an automatic private branch exchange, it will be apparent that the matter of providing busy verification facilities in connection with such an installation has heretofore involved major problems from the standpoints of circuit and equipment redesign together with economic and space problems.

Accordingly it is an object of the present invention to improve the operation of automatic private branch exchange systems.

It is another object of the invention to permit the apparent busy condition of a station to be checked by an attendant of an automatic private branch exchange.

As pointed out above, provision of busy verification facilities in connection with an automatic private branch exchange has heretofore presented substantial problems due largely to the fact that there is inherent in such facilities the ability of the attendant to cut in on a busy line and that this funcion is ordinarily denied to the attendant. The present invention takes advantage in a novel manner of one particular operational procedure in the automatic private branch exchange of the type disclosed in the Williams Patent 2,904,637 whereby steps initiated by the attendant result in the marker cutting through a connection to a station line even through the line shows a "busy" condition. To illustrate, and as fully disclosed in the Williams Patent 2,904,637, when a PBX extension station seizes an attendant's trunk and requests an "outside" or central office trunk call, the attendant, after receiving the calling information, requests the calling PBX station to remain off-hook, and places the attendant's trunk on HOLD. The attendant disconnects from the attendant's trunk and dials the outside number over a central office trunk. When the called party responds, the attendant operates her DIAL BACK key and then dials the number of the calling PBX station which is being held by the attendant's trunk and is, of course, in a "busy" condition, being off-hook. The marker now proceeds to set up a connection from the "in end" of the central office trunk to the calling PBX station, disregarding the "busy" indication of the latter. In accordance with the novel, basic procedure of the present invention, operations are introduced as described in detail below which are effective to cause the marker to temporarily look upon the busy verification trunk as a central office trunk whereby the verification trunk may be cut through to a busy PBX station line in the same general manner as described above in connection with the completion of an outside call for a PBX station.

In accordance with a specific embodiment of our invention the busy verification auxiliary trunk circuit, which is adapted to be used in conjunction with an automatic private branch exchange, operates as an auxiliary to one particular attendant's trunk of the PBX and provides for establishing a talking connection between the attendant and any extension station of the PBX whether idle, busy or camped-on. The busy verification circuit is activated by the attendant first operating the attendant's pickup key and then operating the DIAL BACK key. Operation of the DIAL BACK key causes insertion of the busy verification circuit between the attendant's trunk and the marker and also causes a transfer of "tens-units" registration whereby to give the busy verification connection a "central office trunk" class of service during marker action. This is effective to cause the marker to cut through the verification connection to the dialed PBX station even though the station is busy.

A feature of the invention is means for temporarily changing the class of service of the busy verification connection to that of a central office trunk.

Another feature of the invention is means for supplying ringing current and talking current over the busy verification trunk when a connection is completed to an idle station.

Yet another feature is means for applying a warning signal over the busy verification trunk when a connection is completed to a busy station.

A still further feature of the invention is means for preventing seizing and holding the central office trunk for completion of a call thereover during the time the verification connection has been assigned the class of service of the trunk.

Figure 2:
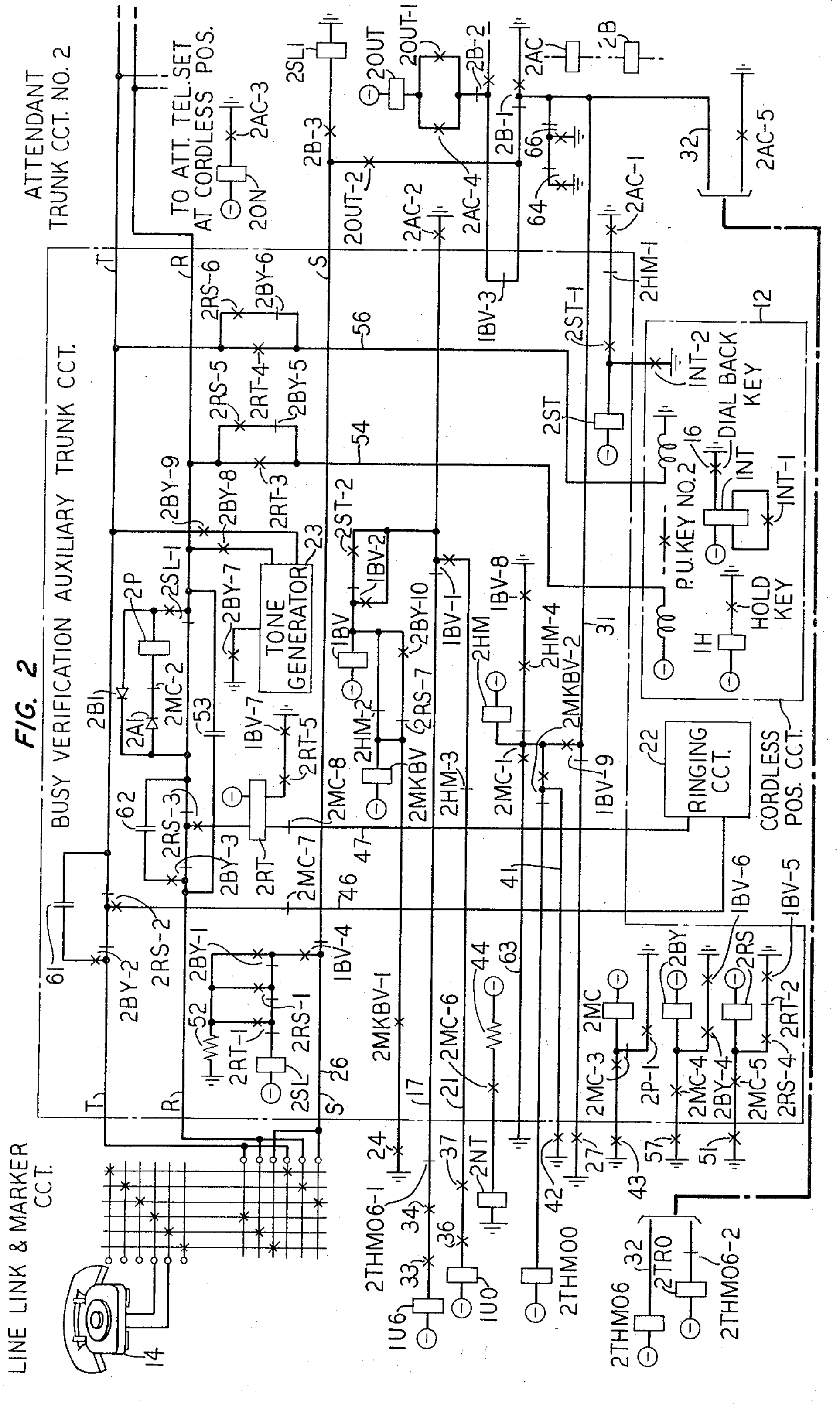

A full understanding of the arrangement contemplated by the present invention as well as an appreciation of the various advantageous features thereof may be gained from consideration of the following detailed description in connection with the accompanying drawing in which:

FIG. 1 shows schematically the relationship of certain of the basic individual circuits which comprise one specific illustrative embodiment of the PBX system contemplated by the invention; and FIG. 2 shows in detail certain of the circuits indicated in FIG. 1.

The arrangement and operation of the various components of the illustrative embodiment of the invention will be described in detail subsequently with reference to FIG. 2. However, in order to first gain a general over-all understanding of the arrangement contemplated, a brief general description will be given at this point with particular reference to FIG. 1. Referring, therefore, to FIG. 1, portions of an automatic crossbar PBX are shown in highly schematic form; it will be assumed for purposes of simplified disclosure that the PBX follows the general arrangement described in detail in R. D. Williams Patent 2,904,637, issued Sept. 15, 1959. The busy verification circuit contemplated by the present invention is particularly adapted to use in conjunction with the basic switching and controlling circuits fully described in the Williams patent and such circuits will be described in the present disclosure only to the extent necessary for full understanding of the invention.

The line link and marker circuit 11, the cordless position circuit 12 and the attendant's trunk circuit 13 of the PBX are shown as captioned boxes; it will be understood that the basic arrangement of these circuits is as fully described in the Williams patent referred to and that any modifications introduced in the respective circuits because of the provision of the busy verification circuit will be described below. It will be assumed that the attendant wishes to verify an indicated busy condition of PBX extension station 14; the attendant's trunk circuit indicated will be assumed to be No. 2 of the group of attendant's trunk circuits provided in the PBX. The attendant's telephone set included in the cordless position circuit 12 may be connected to the attendant's trunk circuit 13 by line 15.

Attendan't trunk circuit No. 2 indicated by captioned box 13 is picked up from cordless position circuit 12 by closing pickup key No. 2; one pickup key is provided for each attendant's trunk circuit as described in the Williams patent referred to above. This operation results in attachment of the marker and in marker action to attach a dial pulse register. At this point the attendant's trunk circuit functions in its normal manner, that is as if the busy verification circuit of the present invention were not provided. However, upon momentary operation of the DIAL BACK key 16 of the cordless position circuit, talking and control circuits between the marker of the line, link and marker circuit 11 and the attendant's trunk circuit 13 are rerouted via the busy verification trunk circuit whereby to provide busy verification features.

The talking and control circuits mentioned just above will be described in detail subsequently with reference to FIG. 2 and need not be described here. However, mention may well be made at this point of the manner in which the "class of service" of the attendant's trunk circuit is temporarily changed from its normal designation to that of a central office trunk which will be assumed to be the zero (0) designated trunk. The normal attendant's trunk circuit class of service is assigned to attendant's trunk circuit 13 when ground is applied to lead 17 from the attendant's trunk circuit whereby to operate units relay 1U6 of the marker. As fully described in the Williams Patent 2,904,637 previously referred to, subsequent operations following operation of relay 1U6 establish the normal attendant's trunk class of service. However, upon operation of relay 1BV (busy verification) in accordance with the novel features of the invention and as will be described in detail subsequently, the ground is now applied over lead 21 whereby to operate units relay 1UO of the marker. Operation of relay 1UO results in subsequent operations whereby to temporarily establish the class of service for the attendant's trunk as that normally assigned to the central office trunk designated 0. Accordingly, when station 14 is subsequently dialed as described below the marker will complete a connection thereto for the attendant's trunk circuit even though the station is actually busy.

As will be described in detail subsequently, if the extension station 14 is idle when the connection is set up, ringing current will be supplied from source 22 for calling the extension, and when the called party responds to the ringing, talking battery will be supplied from the cordless position circuit 12. On the other hand, if station 14 is actually in talking condition when the connection is cut through, neither ringing current nor talking battery will be supplied by the verification trunk but a warning tone will be applied to the line from source 23 and supplied both to station 14 and to the attendant's trunk circuit 13.

Referring now to FIG. 2 for a more detailed disclosure of the specific illustrative embodiment of the invention, it will be assumed again that the attendant's trunk circuit No. 2 is picked up by operation of the pickup key No. 2 of the cordless position circuit 12, and that this is followed by operation of DIAL BACK key 16 whereby to actuate the busy verification circuit. Operation of key 16 closes an obvious operate path for relay INT (no test) which, upon operating, closes at its INT–1 make contact a short-circuiting path on the secondary winding thereby imparting a slow-release characteristic to the relay. Relay INT, operated, closes at its INT–2 make contact an obvious operate path for relay 2ST which upon operating locks to ground through its make contact 2ST–1, break contact 2HM–1 and make contact 2AC–1. (Relay 2AC of the attendant's trunk circuit operated following operation of PICKUP KEY No. 2 in accord with the normal operation of the over-all system.) Relay 2ST, operated, completes an operate path for busy verification relay 1BV from ground, make contacts 2AC–2 and 2ST–2, the break contact of transfer pair 1BV–2, winding of relay 1BV to battery and a similar path for marker busy verification relay 2MKBV, which path also includes break contact 2HM–2. Relay 1BV upon operating locks to the ground in the attendant's trunk circuit through the make contact of transfer pair 1BV–2, and relay 2MKBV, upon operating, locks through its make contact 2MKBV–1 to ground at make contact 24 of a marker relay which is operated at this point in accordance with the normal marker operation.

Relay 1BV, operated, opens at its break contact 1BV–3 the operate path of relay 2OUT; transfers the marker sleeve lead 26 at the make contact of transfer pair 1BV–4 from the attendant's trunk circuit to a path for operating relay 2SL through break contacts of respective transfer pairs 2BY–1, 2RS–1 and 2RT–1; prepares locking paths for relay 2RS (at make contact 1BV–5), relay 2BY (at make contact 1BV–6), relay 2RT (at make contact 1BV–7), and relay 2HM (at make contact 1BV–8); and releases trunk hold magnet 2THMO6 of the marker by interrupting at the break contact of transfer pair 1BV–9 the connection to ground at make contact 27 of an operated marker relay over leads 31 and 32. Release of the trunk hold magnet releases the dial pulse register.

In addition to the above functions, operation of relay 1BV is effective, as described above in reference to FIG. 1, to initiate a change in class of service with regard to attendant's trunk circuit No. 2. The ground normally supplied from the attendant's trunk circuit over lead 17 to operate units relay 1U6, which path includes break contact 2THMO6–1 and make contacts 33 and 34 of relays which are operated at this point through normal marker operation, is now transferred at the make contact of transfer pair 1BV–1 to lead 21 whereby to release units relay 1U6 and to operate units relay 1UO over a path which also includes break contact 2HM–3 and make contacts 36 and 37 of relays which are operated at this point through normal marker operation.

Operation of relay 1UO, the units relay normally associated with central office trunk 0, is followed by relay operations in the marker and dial pulse register which are effective to temporarily assign to attendant's trunk circuit No. 2 the "central office trunk" class of service normally assigned to central office trunk 0. Accordingly, through this simple, yet novel, expedient, circuit conditions are established which will cause the marker to subsequently cut the verification connection through to PBX extension station 14 even though the station is actually in busy condition. As mentioned above, marker action for cutting the connection through to the busy station line is generally the same as that normally prevailing in the type of crossbar PBX involved when the attendant is completing a connection between a PBX extension and an outside party over a central office trunk. In such instance, as described above, the marker cuts the central office trunk through to the "busy" PBX extension, and in the present instance, since the attendant's trunk circuit No. 2 has been temporarily given the trunk class of service, through the novel procedure described, the marker is led to treat the attendant's trunk circuit as a central office trunk and to complete the connection to the busy station line.

Relay 2MKBV, operated as above described, opens at the break contact of transfer pair 2MKBV–2 the path over lead 41 from ground at make contact 42 of a marker relay whereby to prevent operation of hold magnet 2THMO0; this hold magnet is associated with central office trunk 0 so it follows that holding this central office trunk for completion of a call thereover is prevented while the busy verification connection is being set up even though the trunk is seized by the marker. (It will be recalled that the class of service normally assigned to central office trunk 0 has been also temporarily assigned to the busy verification connection.) Also relay 2MKBV, operated, prepares at the make contact of transfer pair 2MKBV–2 paths for operating relay 2HM and trunk hold magnet 2THMO6 when marker ground is subsequently applied to lead 41.

Release of trunk hold magnet 2THMO6, as above described, starts marker action in the normal manner. This action includes the establishment of a trunk class of service for the busy verification call as described above. In completing a connection to a dial pulse register in the normal manner, an operated relay applies ground to lead 41 at make contact 42. Relay 2HM is now operated from this ground through the make contact of transfer pair 2MKBV–2, and trunk magnet 2THMO6 is reoperated from this ground, the make contacts of transfer pairs 2MKBV–2 and 1BV–9, leads 31 and 32, winding of magnet 2THMO6 to battery.

Relay 2HM, operated, locks to ground through the break contact of transfer pair 2MC–1, and make contacts 2HM–4 and 1BV–8; opens at break contact 2HM–3 lead 21 to the marker; opens at break contact 2HM–2 the original operate path for relay 2MKBV; and releases relay 2ST by opening the holding path at break contact 2HM–1.

When a connection between the attendant's trunk circuit No. 2 and the dial pulse register (not shown) has been established through normal marker action as fully described in the Williams patent referred to above, the marker releases, but relay 2SL is held operated by ground supplied over sleeve lead 26 from the dial pulse register. Relay 2SL prepares at the make contact of transfer pair 2SL–1 an operate path for relay 2P which is associated with the ring lead. Diodes 2A1 and 2B1 are associated with operating paths of relay 2P.

Upon attachment of the dial pulse register the attendant receives dial tone in the normal manner as an indication that she may start dialing. At this point it will be recalled that relays 1BV, 2SL and 2HM are operated and that relays 2RT, 2RS, 2P, 2ST, 2MC, 2BY and 2MKBV are released.

*Completion of busy verification call—station idle*

It will be assumed first for purposes of further description that extension station 14 is actually in idle condition at the time the busy verification check is being made. The attendant dials the calling code of station 14, and, after the dialing has been completed, the dial pulse register recalls the marker in the normal manner. During the normal marker action which follows, battery and ground are reversed to the tip and ring leads whereby to operate polarized relay 2P. Relay 2P, operated, completes an obvious operate path for relay 2MC which, upon operating, locks to marker controlled ground through the make contact of its transfer pair 2MC–3 and make contact 43 of a marker relay which is operated at this point.

Relay 2MC, operated, prepares operate paths for relay 2RS (at make contact 2MC–5) and relay 2BY (at make contact 2MC–4), and releases relay 2P by opening the operate path at break contact 2MC–2. Also relay 2MC, operated, completes an obvious operate path through make contact 2MC–6 and resistor 44 for marker relay 2NT, which upon operating inhibits the normal hunting feature of the marker; supplies marker ground through the make contact of its transfer pair 2MC–1 for holding relay 2HM and hold magnet 2THMO6 operated (over leads 31 and 32); and opens at break contacts 2MC–7 and 2MC–8 ringing supply leads 46 and 47 whereby to prevent the application of ringing potential to the line when relay 2RS operates.

Also, normal marker action at this time closes make contact 51 whereupon relay 2RS operates over an obvious path and locks to ground through make contact 2RS–4, break contact 2RT–2 and make contact 1BV–5. Relay 2RS, operated, releases relay 2SL by opening the operate path at the break contact of transfer pair 2RS–1, and applies holding ground through resistor 52 and the make contact of the same transfer pair to sleeve lead 26, and also at the break contacts of respective transfer pairs 2RS–2 and 2RS–3 opens the tip and ring path toward the attendant and prepares at the make contacts of the same respective transfer pairs a path for applying ringing potential over the line toward station 14; one side of the last-mentioned path includes as a series element the left winding of relay 2RT. An audible ringing feedback path to the attendant is provided through capacitor 53. Also with relay 2RS operated and 2BY released, talking battery and ground are applied to the line from cordless position circuit 12 over lead 54, break contact 2BY–5 and make contact 2RS–5 and over lead 56, break contact 2BY–6 and make contact 2RS–6.

When the marker has completed its action it releases relay 2MC; this closes line 46 at break contact 2MC–7 and line 47 at break contact 2MC–8 and ringing potential from source 22 is applied to the line and transmitted thereover to the called extension station 14.

When the called station 14 goes off-hook in response to the ringing, the station loop is closed and relay 2RT operates over its left winding and locks to ground through make contacts 2RT–5 and 1BV–7.

Relay 2RT, operated, prepares at the make contact of transfer pair 2RT–1 a path for continuing the connection of ground to sleeve lead 26 after release of relay 2RS; and releases relay 2RS by opening the holding path thereof at break contact 2RT–2. (Release of relay 2RS cuts the tip and ring leads through to the attendant at the break contacts of respective transfer pairs 2RS–2 and 2RS–3.) Also, relay 2RT operated, provides paths at respective make contacts 2RT–3 and 2RT–4 for maintaining the supply of talking battery and ground to the line after relay 2RS has released.

A talking connection has now been established between attendant's trunk circuit No. 2 and extension station 14 and the attendant may make such inquiries or explanations as appear in order in connection with verification of the condition of station 14.

The verification connection may be released by releasing the pickup key No. 2 in the cordless position circuit either by direct operation or through operation of a RELEASE key. Release of the pickup key releases relay 2AC which, in turn, releases relay 2ON, both these relays being included in the attendant's trunk circuit No. 2. Release of relay 2AC also releases relay 1BV by removing the ground at make contact 2AC–2. Relay 1BV, released, releases all operated relays in the busy verification auxiliary trunk circuit, restoring the circuit to normal, idle condition. Trunk hold magnet 2THMO6 of the line, link and marker circuit is also released at this point.

*Completion of busy verification call—station busy*

For purposes of further description, it will now be assumed that station 14 is actually busy, that is, it is in talking connection with another station. The circuit action during a busy verification call is the same as that described above, when station 14 was assumed to be idle, up to the point at which relay 2MC has been operated by marker action. It will be recalled that relay 2MC, upon operating, locked to marker ground through the make contact of its transfer pair 2MC–3, and, among other operations, prepared operate paths for relays 2RS and 2BY, and released relay 2P. Now, when the marker is recalled to complete the connection, a busy condition at the called station causes make contact 57 of a marker relay to be closed and relay 2BY (busy) operates from ground through make contacts 57 and 2MC–4, and, upon operating, locks to ground through make contacts 2BY–4 and 1BV–6.

Relay 2BY, operated, applies ground through make contact 2BY–7 to tone generator 23 whereby to "start" the tone. Tone generator 23 may be any one of many tone sources known in the art and the tone produced may well be of the intermittent "beep" type commonly utilized in connection with telephone message recorders. Also, relay 2BY, operated, completes paths at make contacts 2BY–8 and 2BY–9 for applying this tone to the tip and ring of the line.

In addition, relay 2BY, operated, opens at break contacts 2BY–5 and 2BY–6 the paths for applying talking battery and ground to the line; opens the tip and ring leads at the break contact of transfer pairs 2BY–2 and 2BY–3 and establishes by-paths through capacitors 61 and 62 at the make contacts of the same transfer pairs; releases relay 2SL at the break contact of transfer pair 2BY–1 and connects ground through resistor 52 to the sleeve lead 26 through the make contact of the same transfer pair; and closes an operate path for relay 2MKVB from ground, make contact 2AC–2, the make contact of transfer pair 1BV–2, make contact 2BY–10, break contact 2RS–7, winding of relay 2MKBV to battery. Further action of the marker results through operation of marker relays not shown in removal of ground from lead 63 and release of relay 2HM and trunk hold magnet 2THMO6 but continuing action of the marker restores this ground and the relay and hold magnet reoperate. Subsequent marker action results in the operation of relay 2RS which releases relay 2MKBV by opening the last-mentioned operate path at break contact 2RS–7. This is followed by release of the marker.

The marker, in releasing, releases relay 2MC at make contact 43; this transfers, through the break contact of transfer pair 2MC–1, relay 2HM and trunk hold magnet 2THMO6 to locking ground at make contact 1BV–8, and releases, at make contact 2MC–6, relay 2NT of the marker.

A monitoring connection, including paths through capacitors 61 and 62, is now established between the attendant and station 14; the attendant may merely listen in long enough to verify the actual talking condition on the line or, if appropriate, may communicate with the party. Tone from source 23 is applied to the connection as above described and will be heard by the attendant, the party at station 14 and any other parties who are on the connection.

It will be understood that in the situation just described, the marker acted to cut the attendant's trunk circuit through to the busy line at station 14 only because of the novel expedient of assigning a trunk class of service to the attendant's trunk circuit whereby to cause the marker to follow the normal procedure of cutting a central office trunk through to an off-hook ("busy") station.

In the event station 14 were both busy and camped-on the busy verification circuit operation would have been the same as that described in connection with the busy station. The busy verification auxiliary trunk circuit does not recognize the "camp-on stop" condition but directs the marker to make a double connection to the busy line. If the busy station goes on-hook during busy verification, connection of the camping trunk is prevented by the connection of the sleeve ground through resistor 52 of the verification trunk to sleeve lead 26.

The busy verification connection is released in the same manner described above in reference to a connection to station 14 while in idle condition.

It will be apparent from the above description that the unique arrangement provided accomplishes in a simple manner the over-all desired objective of causing the marker to cut through the verification circuit to a busy station line. It follows, from the fact that normal operations of the basic circuits of the PBX are largely utilized, that the verification circuit described can be incorporated in the PBX installation without undue problems of cost, space or circuit redesign.

It is to be understood that the above-described arrangements are illustrative of the application of the principles of the invention. Numerous other arrangements may be devised by those skilled in the art without departing from the spirit and scope of the invention.

What is claimed is:

1. In a private branch exchange telephone switching system, a plurality of extension stations, a plurality of trunks extending to a central office, an attendant's position, at least one attendant's trunk circuit associated with said position, means for normally assigning a trunk class of service for said trunks and an attendant's class of service for said attendant's trunk circuit, a marker responsive to said service classes for controlling the connections between said extension stations, trunks and attendant's trunk circuit, and means controlled by said attendant's trunk circuit for overriding a busy condition on one of said extension stations to connect said attendant's trunk circuit to said one extension station, said overriding means including means for changing the class of service of said attendant's trunk circuit to a trunk class of service.

2. In a private branch exchange telephone switching system, the combination defined by claim 1 further characterized in that the class of service of said attendant's trunk circuit is changed to that of a particular central office trunk, and further including means for preventing seizure and holding of said particular trunk by said marker.

3. In a private branch exchange telephone switching system, a plurality of extension stations, a plurality of trunks extending to a central office, an attendant's position, an attendant's trunk circuit associated with said position, a verification circuit, a marker, means controlled at said position for connecting said verification circuit between said attendant's trunk circuit and said marker, means for normally assigning a trunk class of service for said trunks and an attendant's class of service for said attendant's trunk circuit, said marker being responsive to said service classes for controlling the connections between said extension stations, trunks and attendant's trunk circuit, and means controlled by said attendant's trunk circuit for overriding a busy condition on one of said extension stations to connect said attendant's trunk circuit to said one extension station, said overriding means including means in said verification circuit for changing the class of service of said attendant's trunk circuit to a trunk class of service.

4. In a private branch exchange telephone switching system, a plurality of extension stations, a plurality of trunks extending to a central office, an attendant's position, an attendant's trunk circuit associated with said position, a verification circuit, a marker, means controlled at said position for connecting said verification circuit between said attendant's trunk circuit and said marker, a first relay and a second relay included in said marker, operation of said first relay being effective to assign an attendant's class of service for said attendant's trunk circuit, means for normally assigning a trunk class of service to said trunks, said marker being responsive to said service classes for controlling the connections between said extension stations, trunks and attendant's trunk circuit, and means for overriding a busy condition on one of said extension stations to connect said attendant's trunk circuit to said one extension station, said overriding means including means included in said verification circuit for releasing said first relay and operating said second relay to change the class of service of said attendant's trunk circuit to a trunk class of service.

5. In a private branch exchange telephone switching system, the combination defined by claim 4 further characterized in that the class of service of said attendant's trunk circuit is changed to that of a particular central office trunk, and further including means for preventing seizure and holding of said particular trunk by said marker.

6. In a private branch exchange telephone switching system, the combination defined by claim 5 further characterized in that said overriding means includes a third relay, operation of said third relay being effective to activate said seizure and holding preventing means.

7. In a private branch exchange telephone switching system, a plurality of extension stations, a plurality of trunks extending to a central office, an attendant's position, an attendant's trunk circuit associated with said position, a verification circuit, a marker, means controlled at said position for connecting said verification circuit between said attendant's trunk circuit and said marker, means for normally assigning a trunk class of service for said trunks and an attendant's class of service for said attendant's trunk circuit, said marker being responsive to said service classes for controlling the connections between said extension stations, trunks and attendant's trunk circuit, means controlled by said attendant's trunk circuit for establishing a connection between said attendant's trunk circuit and one of said extension stations, said means including means for overriding a possible busy condition on said one extension station, said overriding means including means for changing the class of service of said attendant's trunk circuit to a trunk class of service, a source of ringing current and a source of talking battery, means effective upon establishment of a connection of said attendant's trunk circuit to said one extension station when in idle condition for applying ringing current from said first source to the line of said one extension station, and means effective upon said one extension station going off-hook for removing the ringing current from said line and for applying talking battery thereto from said second source.

8. In a private branch exchange telephone switching system, the combination defined by claim 7 further characterized in the provision of a tone source and means effective upon establishment of a connection of said attendant's trunk circuit to said one extension station when in busy condition for connecting the output of said tone source to said line of said one extension station.

No references cited.

KATHLEEN H. CLAFFY, *Primary Examiner.*

WILLIAM C. COOPER, *Examiner.*